US008862072B2

(12) United States Patent
Yarasi et al.

(10) Patent No.: US 8,862,072 B2
(45) Date of Patent: Oct. 14, 2014

(54) INFORMATION HANDLING SYSTEM TUNABLE ANTENNA FOR WIRELESS NETWORK ADAPTABILITY

(75) Inventors: Sripathi Yarasi, Euless, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 637 days.

(21) Appl. No.: 13/020,627

(22) Filed: Feb. 3, 2011

(65) Prior Publication Data

US 2012/0202434 A1 Aug. 9, 2012

(51) Int. Cl.
*H04B 1/40* (2006.01)

(52) U.S. Cl.
USPC ............ 455/77; 455/87; 455/552.1; 343/724; 343/745

(58) Field of Classification Search
None
See application file for complete search history.

(56) References Cited

U.S. PATENT DOCUMENTS

| | | | | |
|---|---|---|---|---|
| 2006/0192720 | A1* | 8/2006 | Shtrom | 343/795 |
| 2008/0106476 | A1 | 5/2008 | Tran et al. | |
| 2009/0051610 | A1 | 2/2009 | Sugiyama | |
| 2010/0053007 | A1* | 3/2010 | Ni et al. | 343/745 |

* cited by examiner

*Primary Examiner* — Nay A Maung
*Assistant Examiner* — Alejandro Rivero
(74) *Attorney, Agent, or Firm* — Terrile, Cannatti, Chambers & Holland, LLP; Robert W. Holland

(57) ABSTRACT

A tuning circuit disposed between an antenna and wireless network interface card selectively adjusts transmissions from the antenna to plural frequency bands, each band associated with wireless signals of a wireless network provider. A direct current bias selectively applies to tuning circuit analog components to adjust the frequency band as desired to support communication for a selected wireless provider.

20 Claims, 2 Drawing Sheets

INFORMATION HANDLING SYSTEM TUNABLE ANTENNA FOR WIRELESS NETWORK ADAPTABILITY

BACKGROUND OF THE INVENTION

1. Field of the Invention

The present invention relates in general to the field of information handling system wireless communication, and more particularly to an information handling system tunable antenna for wireless network adaptability.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Wireless communication has made portable information handling systems a powerful tool for use by businesses and individuals. Wireless local area networks (WLANS) and personal area networks compliant with the IEEE 802.11 standard allow end users to communicate with other information handling systems and with peripheral devices through wireless interfaces. Such wireless communication makes portable information handling systems convenient to use by eliminating the need for wire interfaces to networks and peripherals, and by allowing wireless interfaces with mobile hotspots, such as within a work environment, a coffee house or an airport. Wireless wide area networks (WWAN) provide network interconnectivity over long distances, such as through existing mobile cellular telephone networks. In order to communicate over each type of network, portable information handling systems typically integrate a wireless antenna for the frequency band associated with each type of network. In some instances of wide area networks, specific frequency ranges are supported depending upon the provider of wireless networking service used by the end user of the information handling system.

One difficulty with supporting wireless networking at a portable information handling system is including an antenna for each wireless network frequency of interest to the end user. This difficulty is exasperated when new and emerging technologies become available that change the frequencies involved in wireless networking. For example, a mobile telephone provider who includes wireless networking service may purchase new wireless spectrum or wireless transmitters of other service providers in order to expand wireless networking services. If the new spectrum is not supported by antennae in existing systems, then existing systems will have limited or no access to the new spectrum. Another problem is that a confusing array of antennae available for incorporation in information handling systems increases the difficulty of manufacture of portable information handling systems. An inventory of antennae is typically maintained for each type of supported wireless network. Tracking an inventory with a large number of parts is difficult, as is selecting the right part for inclusion in a given information handling system. One option is to include a tunable antenna, however, conventional tunable antennae tend to be too expensive for implementation in typical commercial and consumer information handling systems. WWAN spectrum tends to use antennae with a larger physical footprint than antennae in the WLAN bands that typically operate in the 2.4 to 5 GHz band. Further, the introduction of lower operating frequency WWAN bands, such as 700 MHz versus existing 842 MHz systems, will call for antennae with a big volume, which will increase platform form factor.

SUMMARY OF THE INVENTION

Therefore a need has arisen for a system and method which supports cost effective implementation of tunable antennae to selectively interact with plural wireless networking frequencies.

In accordance with the present invention, a system and method are provided which substantially reduce the disadvantages and problems associated with previous methods and systems for communicating through plural frequencies at a portable information handling system. Plural tuning states are selected by selecting a direct current bias to input at an analog tuning circuit. A controller circuit of a wireless network interface card (WNIC) at a portable information handling system selectively applies a desired direct current bias to select a tuning state associated with a network that the WNIC is attempting to communicate through.

More specifically, a portable information handling system has plural processing components disposed in a housing to process information. A WNIC communicates information of the portable information handling system through a selected of plural wireless networks. In order to support communication through a desired frequency band, a tuning circuit adjusts the frequency band tuning state of an antenna integrated in the portable information handling system to the frequency band associated with the wireless network accessed by the WNIC. A controller circuit applies a direct current bias to the tuning circuit to adjust analog components of the tuning circuit so that the antenna enters a desired tuning state having a set of frequencies used to communicate over a desired network. For example, the controller circuit sets a tuning state associated with a WWAN service provider based upon the WNIC's attempt to communicate over a network of the service provider. Updates to firmware of the controller circuit allow adjustments of the level of direct current voltage applied to the tuning circuit so that an installed antenna can adjust to new tuning states as desired.

The present invention provides a number of important technical advantages. One example of an important technical advantage is that a cost effective tunable antenna is enabled at a portable information handling system to allow a given antenna flexibility to communicate over plural WWAN networks by adjusting a bias current applied to a tuning circuit. A tunable antenna decreases complexity for information handling system design and manufacture by reducing inventory of antenna types, reducing system design and complexity and reducing the part identification to the mechanical structure of the system. Further, a tunable antenna lets an installed base of information handling systems adjust to the network frequencies of a service provider as the frequencies change by updating the direct current bias to define new tuning states that correspond to frequencies adapted by a wireless provider.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A tuning circuit disposed between a wireless network interface card and an antenna, selects frequency bands with which the antenna outputs wireless signals from a portable information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
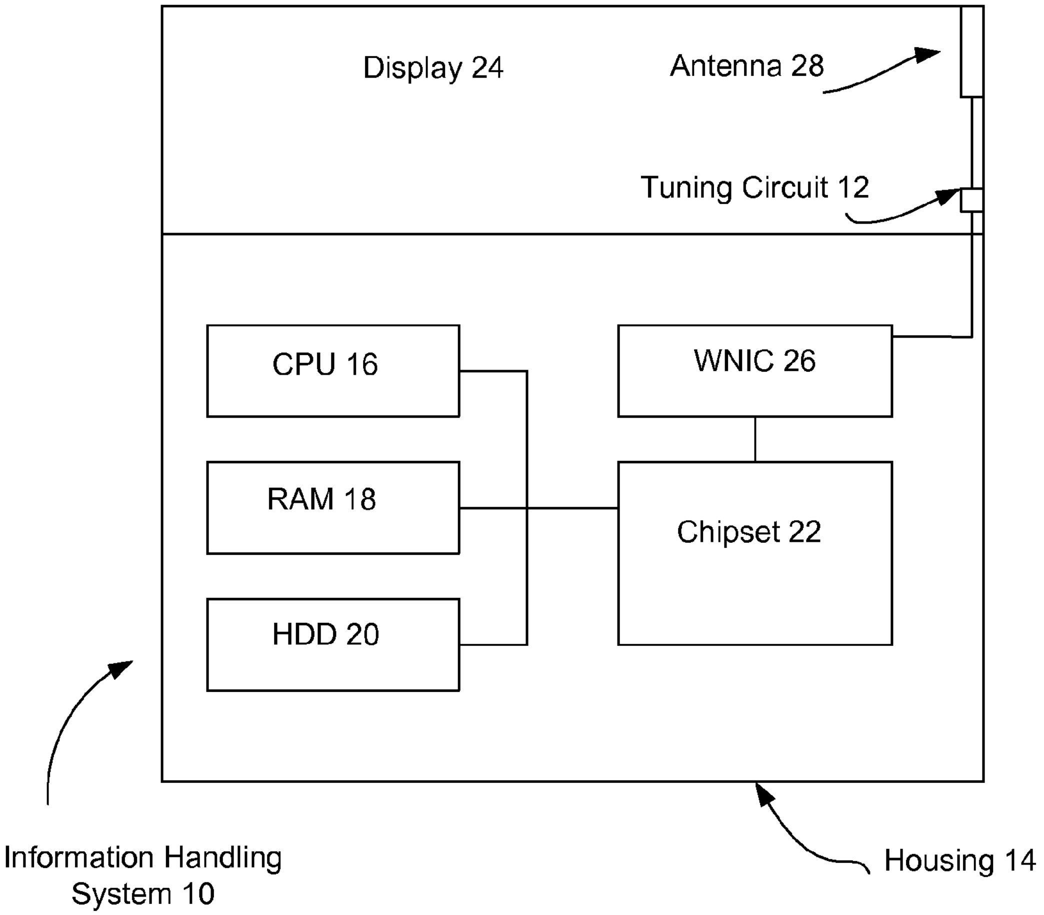
FIG. 1 depicts a block diagram of a portable information handling system having an antenna tuning circuit with selectable frequency bands.

Referring now to FIG. 1, a block diagram depicts a portable information handling system 10 having an antenna tuning circuit 12 with selectable frequency bands. Portable information handling system 10 has plural processing components disposed in a housing 14 that cooperate to process information, such as a CPU 16, RAM 18, a hard disk drive 20, and a chipset 22. Information generated by the processing components are presented as visual images at a display 24, which is integrated in a rotatable lid of housing 14. A wireless network interface card (WNIC) 26 or other wireless control element communicates information from portable information handling system 10 to distant wireless nodes, such as an IEEE 802.11 access point of a wireless local area network (WLAN) or a cell phone tower of a wireless wide area network (WWAN). An antenna 28 located in the lid of housing 14 or other convenient location transmits wireless signals for WNIC 26 and receives wireless signals sent from an external location, such as a 3G or 4G wireless network operating in frequency ranges around 700 MHz.

Antenna tuning circuit 12 provides flexibility for the transmission and reception of wireless signals at antenna 28 by selectively adjusting the frequency range to which antenna 28 is tuned to predetermined frequency ranges associated with predetermined WWAN providers. Some examples of antenna tuning are presented in U.S. Pat. No. 7,821,467 and U.S. Patent Publication No. 2008/0106476. Analog tuning circuit 12 applies conventional antenna tuning techniques to adjust the frequency range of antenna 28, however, controls the frequency range to align with the frequency range of selected service providers. Frequency bands are divided into plural tunable states so that an existing antenna 28 can adapt as long term evolution bands come to market. Adjusting an antenna's tunable state to new frequency bands provides an adaptable component that reduces inventory during production and allows firmware updates at an installed base of portable information handling systems so that clients can adjust as a service provider's frequency bands change over time.

Figure 2:
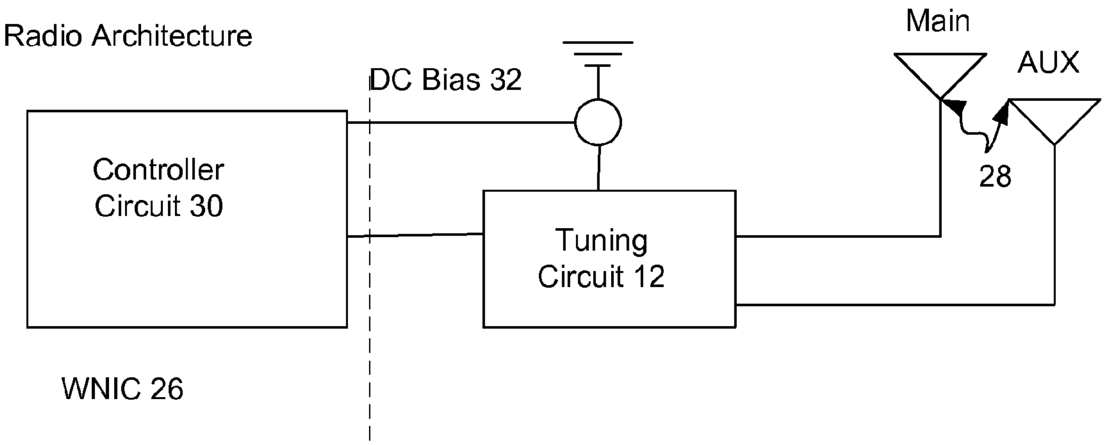
FIG. 2 depicts an example of a radio architecture for providing selectable tuning states at a portable information handling system.

Referring now to FIG. 2, an example is depicted of a radio architecture for providing selectable tuning states at a portable information handling system. A controller circuit 30 of WNIC 26 selectively provides a direct current bias 32 to modify the bias circuit of tuning circuit 12 that "tunes" the transmitted voltage feed to the antennae 28. Controller circuit 30 provides different direct current voltage levels based upon desired different frequency tuning states. Controller circuit 30 may be integrated within WNIC 26 or added as a separate standalone component to housing 12. Direct current bias 32 provided by controller circuit 30 changes capacitor values and matching networks within tuning circuit 12 so that antenna 28 is tuned accordingly. The amount of direct current bias 32 set by controller circuit 30 is determined based upon the network or service provider accessed by WNIC 26 with each network or service provider associated with tuning state and frequency band. For example, firmware within controller circuit 30 sets the direct current bias based upon the network that WNIC 26 intends to access. If frequencies used by WNIC 26 change, a firmware update to controller circuit 30 can expand or shift applicable tuning states as needed to address communication through the changing frequency bands. In order to help with inventory management during manufacture of information handling systems, controller circuit 30, tuning circuit 12 and antenna 28 may be built into a common component, or controller circuit 30 and tuning circuit 12 may be built into a common component that may or may not be integrated in WNIC 26. Multiple direct current bias voltages to support multiple tuning states are provided by one or more of a BST capacitor, a varactor capacitor or PIN diodes.

Figure 3:
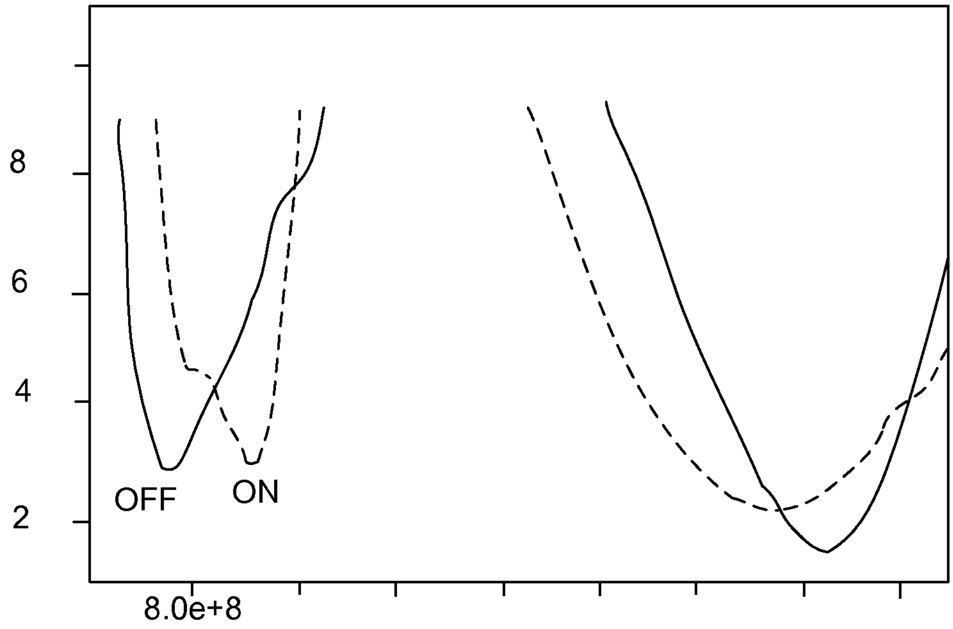
FIG. 3 depicts a frequency graph of tuning states that are selectively enabled by the process of the control element.

Referring now to FIG. 3, a frequency graph depicts tuning states that are selectively engaged with direct current bias 32. Cellular telephone mobile broadband technologies are grouped to provide a feasible tuning scheme with tuning states associated with mobile cellular telephone broadband providers. In the example embodiment of FIG. 3, tunability is provided only at low frequency ranges and remains unaffected by tuning circuit 12 in the high frequency band. In one embodiment, three tuning states are provided as follows for cellular telephone mobile broadband with each tuning state set by a different direct current bias:

State 1: 704 MHz-746 MHz and 1710 MHz-7170 MHz

State 2: 746 MHz-787 MHz

State 3: 824 MHz-960 MHz and 1710 MHz-2170 and 2500 MHZ-2690 MHz.

State 1 supports Long Term Evolution (LTE) band 17 and 4, such as to support AT&T® COMMUNICATIONS. State 2 supports LTE band 13, such as VERIZON® COMMUNICATIONS. State 3 can be divided into two or more sub-states according to the mobile cellular telephone broadband technology and antenna design, such as to support GSM/EGPRS/EVDO/WCDMA, and LTE band 7. In an alternative embodiment with only two states introduced by a PIN diode, tuning states are as follows:

State 1: 704 MHz-787 MHz and 1710 MHz-2170 MHz and 2500 MHz-2690 MHz

State 2: 824 MHz-960 MHz and 1710 MHz-2170 MHz and 2500 MHz-2690 MHz

State 1 supports all LTE bands while state 2 supports all other bands. The number of states selected may depend on design preferences, such as antenna transmission and reception strength and the desired precision of the antenna.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

processing components disposed in the housing and operable to process information;

a wireless network card disposed in the housing and interfaced with the processing components and operable to communicate the information as wireless signals supported by a first mobile cellular telephone broadband provider in a first frequency range and a second mobile cellular telephone broadband provider in a second frequency range;

an antenna disposed in the housing and interfaced with the wireless network card, the antenna operable to transmit and receive the wireless signals;

an analog tuning circuit interfaced with the antenna, the analog tuning circuit having plural tuning states, each tuning state associated with a frequency range including at least a first tuning state frequency range of 704 MHz to 746 MHz and a second tuning state frequency range of 746 MHz to 787 MHz, at least one of the tuning states set by inputting a direct current bias to the analog tuning circuit; and an antenna controller interfaced with the wireless network card and the analog tuning circuit, the antenna controller having firmware operable to selectively input the direct current bias to the analog tuning circuit to select a tuning state of the antenna for the wireless network card to communicate through the first or second frequency range based upon whether the wireless network card is communicating supported by the first or second mobile cellular telephone broadband provider;

wherein the antenna controller is further operable to receive firmware updates to adjust the antenna to a third tuning state for a third frequency range of a third mobile cellular telephone broadband provider by adjusting the level of direct current bias to the analog tuning circuit, the third tuning state frequency range of 824 MHz to 960 MHz, 1710 MHz to 2170 MHz and 2500 MHz to 2690 MHz, the third tuning state dividable into two or more sub-states.

2. The information handling system of claim 1 wherein the direct current bias adjusts capacitor values of the analog tuning circuit for outputting wireless signals in the frequency range of the at least one tuning state set.

3. The information handling system of claim 1 wherein direct current bias is provided by a BST capacitor.

4. The information handling system of claim 1 wherein the direct current bias is provided by a varactor capacitor.

5. The information handling system of claim 1 wherein the direct current bias is provided by a PIN diode.

6. The information handling system of claim 1 wherein the analog tuning circuit and antenna controller are integrated with the wireless network card.

7. The information handling system of claim 1 wherein the analog tuning circuit and antenna controller are integrated with the antenna.

8. The information handling system of claim 1 wherein the antenna communicates through a first and second frequency range without the direct current bias and through the first and a third frequency range with the direct current bias.

9. A method of communicating through plural wireless wide area networks from an information handling system antenna, the method comprising:

sending wireless signals from a wireless network card to an antenna installed in an information handling system for transmission to a wireless wide area network of a selected of plural network providers;

selectively applying, by firmware running on a controller circuit installed in the information handling system, a direct current bias to analog circuits of an analog tuning circuit to tune the antenna to a frequency range associated with the selected network provider; and updating the firmware on the controller circuit after installation of the controller circuit on the information handling system to allow adjustment of the direct current bias to the analog circuits of the analog tuning circuit to tune the antenna to an updated frequency range associated with a previously unsupported network provider, the updated frequency range having a substrate frequency range selected from an available frequency range of 824 MHz to 960 MHz, 1710 MHz to 2170 MHz and 2500 MHz to 2690 MHz.

10. The method of claim 9 wherein selectively applying direct current bias adjusts capacitor values of the analog tuning circuit for tuning the antenna to the frequency range.

11. The method of claim 9 wherein selectively applying direct current bias further comprises applying direct current from a BST capacitor.

12. The method of claim 9 wherein selectively applying direct current bias further comprises applying direct current from a varactor capacitor.

13. The method of claim 9 wherein selectively applying direct current bias further comprises applying direct current from a PIN diode.

14. The method of claim 9 wherein the analog tuning circuit is integrated with the wireless network card.

15. The method of claim 9 wherein the analog tuning circuit is integrated with the antenna.

16. The method of claim 9 wherein the antenna communicates through a first and a third frequency range without the direct current bias and through a second and the third frequency range with the direct current bias.

17. A system for outputting wireless signals from a portable information handling system, the system comprising:

a wireless network card operable to represent information as wireless signals for communication through a selected of a first or second cellular telephone mobile broadband network frequency range, the first cellular telephone mobile broadband network frequency range associated with a first cellular telephone mobile broadband network provider, the second cellular telephone mobile broadband network frequency range associated with a second cellular telephone mobile broadband network provider;

an antenna operable to send wireless signals;

a tuning circuit disposed between the wireless network card and the antenna, the tuning circuit operable to transmit the wireless signals through the antenna with the antenna tuned in a first or second cellular telephone mobile broadband network frequency range, the first frequency range at 704 MHz to 746 MHz and the second frequency range at 746 MHz to 787 MHz;

a direct current bias source interfaced with the tuning circuit and operable to selectively apply a direct current bias to analog components of the tuning circuit to transmit the wireless signals with the antenna tuned in the second frequency range; and a controller circuit interfaced with the wireless network card and the direct current bias source, the controller circuit operable to tune the antenna by selectively applying the direct current bias if the wireless network card is communicating with the second cellular telephone mobile broadband network provider, the controller circuit further operable to accept updates after installation in a portable information handling system, the updates allowing adjustment of the level of direct current bias to adapt the antenna to tune to a third cellular telephone network, the third cellular telephone network having a sub state frequency range selected from a third frequency range of 824 MHz to 960 MHz, 1710 MHz to 2170 MHz and 2500 MHz to 2690 MHz.

18. The system of claim 17 wherein the controller includes logic to alter the direct current bias to adapt to a third cellular telephone mobile broadband network provider.

19. The system of claim 17 wherein the tuning circuit and antenna are integrated as a single component.

20. The system of claim 17 wherein the tuning circuit and wireless network card are integrated as a single component.

* * * * *